US008651745B2

(12) United States Patent
Mayr et al.

(10) Patent No.: US 8,651,745 B2
(45) Date of Patent: Feb. 18, 2014

(54) ELECTRICAL MACHINE HAVING A ROLLER BEARING, WHICH IS PROTECTED AGAINST ELECTRICAL BREAKDOWNS, AND A GEARED MOTOR HAVING SUCH A ROLLER BEARING

(75) Inventors: Franz Mayr, St. Marein bei Graz (AT); Ferdinand Tangl, Hart bei Graz (AT)

(73) Assignee: MAGNA STEYR Fahrzeugtechnik AG & Co. KG, Graz (AT)

( * ) Notice: Subject to any disclaimer, the term of this patent is extended or adjusted under 35 U.S.C. 154(b) by 10 days.

(21) Appl. No.: 13/389,794

(22) PCT Filed: Aug. 10, 2010

(86) PCT No.: PCT/EP2010/061586
§ 371 (c)(1),
(2), (4) Date: Mar. 19, 2012

(87) PCT Pub. No.: WO2011/018447
PCT Pub. Date: Feb. 17, 2011

(65) Prior Publication Data
US 2012/0161563 A1   Jun. 28, 2012

(30) Foreign Application Priority Data
Aug. 10, 2009  (DE) .......................... 10 2009 036 856

(51) Int. Cl.
*F16C 19/00* (2006.01)
*F16C 19/50* (2006.01)
*C10M 173/00* (2006.01)

(52) U.S. Cl.
USPC ............................. 384/462; 384/476; 508/143

(58) Field of Classification Search
USPC ................... 384/462, 464, 473, 476; 310/90; 508/113–131, 143
See application file for complete search history.

(56) References Cited

U.S. PATENT DOCUMENTS

| 3,375,729 | A | * | 4/1968 | Wellard et al. | 74/467 |
| 4,419,252 | A | * | 12/1983 | Shim | 508/373 |
| 4,604,229 | A | | 8/1986 | Raj | |
| 4,770,803 | A | * | 9/1988 | Forsberg | 252/75 |
| 4,797,013 | A | | 1/1989 | Raj | |
| 5,053,661 | A | * | 10/1991 | Kitamura et al. | 310/83 |
| 5,322,373 | A | * | 6/1994 | Oakes et al. | 384/462 |
| 5,773,394 | A | * | 6/1998 | Wan et al. | 508/591 |
| 6,197,099 | B1 | * | 3/2001 | Pearce | 106/122 |

(Continued)

FOREIGN PATENT DOCUMENTS

JP    61200179 A  *  9/1986  ............... C09D 5/24

*Primary Examiner* — Phillip A Johnson
(74) *Attorney, Agent, or Firm* — Jordan IP Law, LLC; Todd A. Vaughn

(57) ABSTRACT

In an electrical machine having a roller bearing, whose inner ring is seated on the rotor shaft of the electrical machine, whose outer ring is seated in a housing and which is located in a closed area, the roller bearing is intended to be protected against electrical breakdowns. For this purpose, the area contains a liquid on an aqueous basis, whose level overhangs the external contour of the inner ring at its lowest point. The inner ring and the outer ring are therefore conductively connected and the voltage can be equalized between the rotor and the housing of the electrical machine, without any impediment and without breakdowns. In an application as a geared motor, the lubricant for the gearbox is also a liquid on an aqueous basis.

13 Claims, 2 Drawing Sheets

(56) References Cited

U.S. PATENT DOCUMENTS

| | | | |
|---|---|---|---|
| 6,734,147 B2 * | 5/2004 | Levy | 508/103 |
| 7,019,431 B1 | 3/2006 | Kerlin | |
| 2005/0062350 A1 * | 3/2005 | Kuo et al. | 310/90 |
| 2005/0078897 A1 | 4/2005 | Zhang | |
| 2010/0284640 A1 * | 11/2010 | Bergling et al. | 384/490 |

* cited by examiner

US 8,651,745 B2

ELECTRICAL MACHINE HAVING A ROLLER BEARING, WHICH IS PROTECTED AGAINST ELECTRICAL BREAKDOWNS, AND A GEARED MOTOR HAVING SUCH A ROLLER BEARING

CROSS-REFERENCE TO RELATED APPLICATIONS

The present application is a National Stage Application of PCT International Application No. PCT/EP2010/061586 (filed on Aug. 10, 2010), under 35 U.S.C. §371, which claims priority to German Patent Application No. 10 2009 036 856.6 (filed on Aug. 10, 2009), which are each hereby incorporated by reference in their respective entireties.

FIELD OF THE INVENTION

The invention relates to electrical machines of all types and for all applications, whose rotor is mounted in roller bearings. Roller bearings include an inner ring, an outer ring, the roller bodies and, possibly, a cage. One ring of the roller bearing (generally, the inner ring) is connected to the rotor of the electrical machine, and the respective other ring (generally, the outer ring) is seated in the housing of the electrical machine.

In electric motors, an asymmetric field distribution results in a circulating current, which induces a small voltage in the shaft of the rotor. In the case of asynchronous motors, a current flows between the stator and the rotor in operating conditions. Furthermore, capacitive discharge currents can also occur between the rotor and the stator, for example in conjunction with a converter operation.

In any case, the circuit is closed via the roller bearings of the rotor bearing. The current flow causes damage to the roller bearings, which are in general lubricated with oil or grease for their life. In this case, the current has to flow between the inner ring and the outer ring through the roller bodies and in the process has to pass through two lubricating films (that between the roller body and on the one hand the inner ring and on the other hand the outer ring). Because the lubricating films form an insulating layer, the current flow is not continuous, but consists of randomly occurring breakdowns of the lubricating film. In this case, current levels of several amperes may occur briefly.

These breakdowns cause damage to the roller bearing, particularly to the raceways of the inner and outer rings. Microcraters and lateral grooves are formed on the raceways, leading to vibration and noise, and finally to failure of the roller bearing.

BACKGROUND OF THE INVENTION

There are essentially two ways to protect the bearings against the described phenomenon: either the roller bearing is isolated, or an electrically conductive link is fitted between the inner ring and the outer ring. The first way is adopted, for example, in DE 100 37 423 A1 or DE 41 00 587 C2, and the second is adopted in EP 892 471 B1.

In DE 100 37 423 A1, an isolating ring is provided between the outer ring and the housing, adversely affecting the seating of the bearing ring, and making installation more difficult. The sliding metallic link in EP 892 471 B1 touches the respective other bearing ring only at points, or at best on a line, as a result of which it can transmit only very low current levels, but not current levels of several amperes. Furthermore, the links are susceptible to wear, and are therefore not reliable in the long term. In EP 892 471 B1, in addition to the metallic link, the roller bearing additionally contains a grease, which is made conductive by the addition of electrically conductive solid particles. The fact that the grease is used in addition to the link indicates that neither the link nor the grease on their own would be sufficient to produce a reliable conductive connection.

SUMMARY OF THE INVENTION

The invention is therefore based on the object of protecting roller bearings in an electrical machine reliably against electrical breakdowns, and avoiding the damage caused thereby, with minimal effort.

In accordance with the invention, this is achieved in that the roller bearing is lubricated with a liquid on an aqueous base which, because of its electrical conductivity, allows voltage equalization between the inner ring and the outer ring, in addition to its electrical conductivity, the liquid on an aqueous basis has ideal characteristics for the lubrication of a roller bearing: low viscosity, which is only slightly dependent on the temperature, high thermal capacity for effective cooling, environmental compatibility, and low costs (water costs nothing). The roller bearings between the rotor and the housing are each seated in a closed area, with the area containing the liquid on an aqueous basis. Its level overhangs the internal contour of the outer ring at its lowest point, thus wetting the roller bodies as they pass by. Ideally and when stationary, the level would extend up to the external contour of the inner ring, but the liquid is displaced by the roller bodies during operation. The area is closed on at least one side by a sealing ring.

If the electrical machine is part of a geared motor, with the housing of the electric motor and the housing of the gearbox being connected to one another and with the rotor shaft of the electric motor or a part connected to it projecting into the gearbox, and being mounted in one of the two housings, this results in a particularly advantageous embodiment. In this embodiment, the gearbox is operated with a lubricant based on water. In this case, the lubricant on an aqueous basis is also passed to the roller bearing, which is arranged in one of the two housings.

Not least also bearing in mind the engagement zones of the gearwheels which rotate in the gearbox, the aqueous lubricant preferably contains dispersed particles of a metallic solid lubricant, preferably of graphite in a range from 0.1 to 20%, depending on the size of the bearings and/or of the gearbox and their tolerances, and the particle size of the solid lubricant. In certain design circumstances, it is advantageous to reduce the proportion of the solid lubricant, and in extreme cases the conductivity reduction caused by this can be compensated for by adding more of an ionization means (for example, amines or dilute acids). The solid lubricant is held dispersed by the stirring effect of the gearwheels. Because, however, the bearings are naturally in a relatively dead area beyond the gearwheels in the housing, less of the dispersed solid lubricant reaches the roller bearing. This lengthens the life of the roller bearing.

In one development of the invention, the lubricating liquid may contain different further additives: an ionization additive (preferably an amine or a dilute acid), in order to increase the conductivity of the aqueous liquid if the conductivity of the solid lubricant is not sufficient for this purpose; a corrosion protection additive (preferably a compound of boric acid and/or a diethanol amine and/or a phosphoric acid ester) for protection and also in order to compensate for or reinforce any ionization effects; an antifreeze (preferably a glycol) for operation outdoors; a surfactant (preferably acetylene glycol, which also improves the corrosion protection) for improving the wetting capability; and, finally, a dispersant in order to avoid demixing.

DETAILED DESCRIPTION OF EMBODIMENTS

Figure 1:
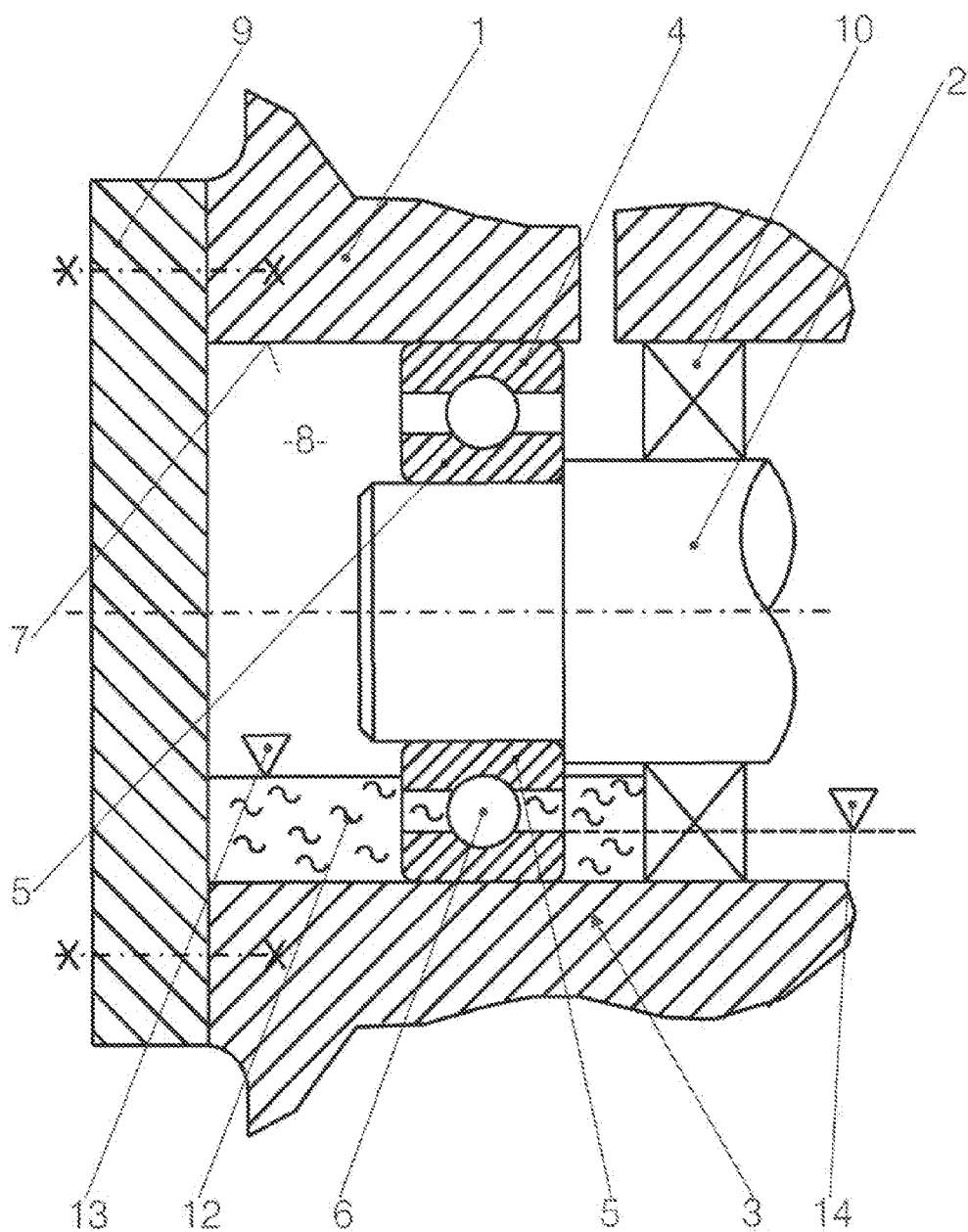
FIG. 1 illustrates the bearing of an electrical machine in accordance with the invention.

As illustrated in FIG. 1, provided is the housing 1 of an electrical machine, of which is illustrated only the part which contains a roller bearing 3 for the rotor shaft 2. The roller bearing 3 includes an outer ring 4, which is seated in a hole 7 in the housing, an inner ring 5, which is pressed onto the rotor shaft 2, and the roller bodies 6. The roller bearing 3 is located in an area 8 which is bounded on one side by a bearing cover 9 and on the other side by a sealing ring 10. A liquid 12 based on water with a liquid level 13 is located as lubricant in the area 8. This liquid level 13 is actually somewhat higher than the lowest point 17 of the inner wall of the outer ring 4. The liquid 12 based on water is electrically conductive, and wets the inner surface of the outer ring 4 at the lowest point, and therefore, also wets the roller bodies 6 as they pass by, which are therefore all wetted and make the electrical connection with the inner ring 5. The liquid level 13 may also be higher, in which case the liquid 12 is displaced by the roller bodies 6 as they pass by. This allows a considerable electric current to flow between the housing 1 and the rotor shaft 2, because the critical junction between the inner ring 5 and the outer ring 4 is produced via a large proportion of the roller bodies 6 at the same time.

Figure 2:
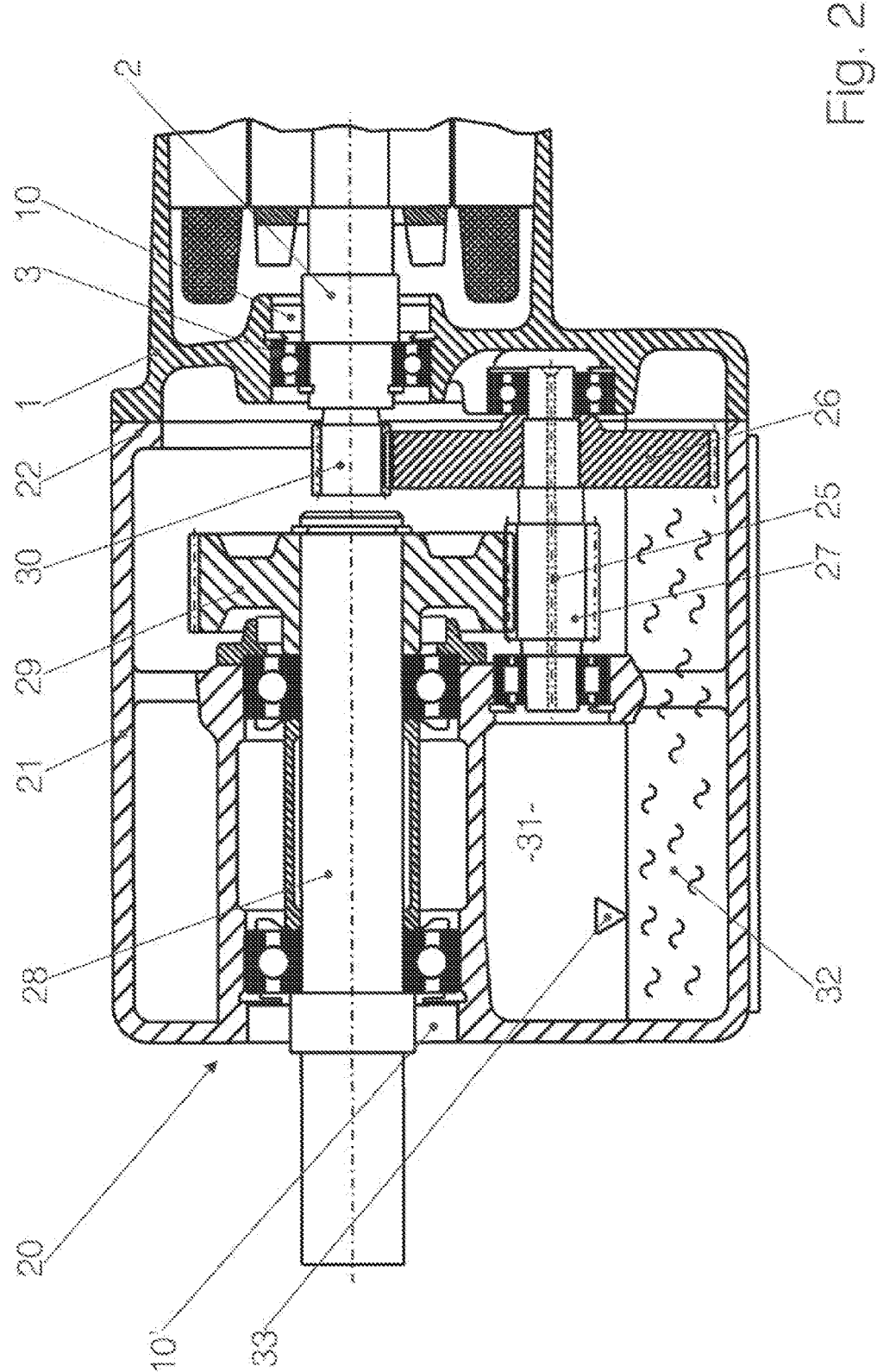
FIG. 2 illustrates a geared motor in accordance with the invention.

As illustrated in FIG. 2, the same parts have the same reference symbols as in FIG. 1. However, in this case, the electrical machine 1 is connected to a gearbox 20. The housing 21 of the gearbox 20 is connected in a sealed manner via a flange 22 to that part of the housing 1 of the electrical machine which contains the roller bearing 3. Without going into the conventional details, the gearbox housing contains a layshaft 25 with gearwheels 26, 27 and an output shaft 28 with a gearwheel 29. The rotor shaft 2 of the electrical machine is used as the input shaft. Its end which can be seen in the figure is mounted in the roller bearing 3, projects further and ends in the pinion 30, which is arranged in a flying form. The roller bearing 3 is separated from the interior of the electrical machine by a sealing ring 10, but is open toward the interior 31 of the gearbox 20.

The gearbox 20 has a lubricant sump 32, formed by a liquid on an aqueous basis. The liquid level 33 is in this case just sufficiently high for the gearwheel 26 to be immersed and to feed the liquid into the area 31. However, within the scope of the invention, pressurized circulating lubrication could likewise be provided. In any case, liquid is also passed to the roller bearing 3, although it is not in the area fed by the gearwheel 26. The liquid on an aqueous basis produces the conductive connection between the rotor 2 and the housing 1, although it could also be the gearbox housing 21, if the flange 21 were arranged differently.

The liquid on an aqueous basis contains a solid lubricant. A solid lubricant such as this could be tin or a suitable molybdenum compound. In the present case, it is flaked graphite with a grain size of less than 20 micrometers in a mixture ratio of between 0.1 and 20% by weight, and in certain conditions (see further above) better below 10%, or even better below 5%.

The liquid on an aqueous basis may also contain further additives, both for the use illustrated in FIG. 1 and FIG. 2, respectively. A boric acid derivative or a carboxylic acid salt of aluminum, zinc or calcium may be used as manner of providing corrosion protection. One of the known antifreezes can be added for use outdoors. An acetylene derivative may be used as a surfactant.

Overall, the large-area conductive contact in the roller bearing avoids any risk of damage to the roller bearing caused by breakdowns or high current levels. When used in a geared motor, this also results in the advantages that the joint lubrication with the aqueous liquid also has for the gearbox: High thermal capacity, stable viscosity, low costs and environmental friendliness.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electrical machine comprising:
   a roller bearing having an inner ring, an outer ring and roller bodies;
   a lubricating liquid which is electrically conductive and configured to lubricate the roller bearing on an aqueous basis and also facilitate voltage equalization between the inner ring and the outer ring, wherein the lubricating liquid contains at least one of an ionization additive, an antifreeze, a surfactant, and a dispersant,
   wherein the volume of the lubricating liquid is such that a fluid level of the lubricating liquid overlaps an inner wall of the outer ring at a lowest point of the inner wall.

2. The electrical machine of claim 1, wherein:
   the inner ring is seated on a rotor shaft of the electrical machine; and
   the outer ring is seated in a housing.

3. The electrical machine of claim 2, wherein the roller bearing is located in an enclosed area.

4. The electrical machine of claim 1, wherein the lubricating liquid contains a metallic solid lubricant.

5. The electrical machine of claim 4, wherein the metallic solid lubricant comprises graphite having a proportion by weight in the liquid on an aqueous basis of between 0.1 to 20%.

6. The electrical machine of claim 4, wherein the proportion by weight of the metallic solid lubricant in the liquid on an aqueous basis is less than 10%.

7. The electrical machine of claim 4, wherein the proportion by weight of the metallic solid lubricant in the liquid on an aqueous basis is less than 5%.

8. A roller bearing comprising:
   an inner ring;
   an outer ring;
   a plurality of roller bodies;

a lubricating liquid which is electrically conductive and configured to lubricate the roller bearing on an aqueous basis and also facilitate voltage equalization between the inner ring and the outer ring, wherein the lubricating liquid contains at least one of an ionization additive, an antifreeze, a surfactant and a dispersant, wherein the volume of the lubricating liquid is such that a fluid level of the lubricating liquid is higher than an inner wall of the outer ring at a lowest point of the inner wall.

9. The roller bearing of claim 8, wherein the lubricating liquid contains a metallic solid lubricant.

10. The roller bearing of claim 9, wherein the metallic solid lubricant comprises graphite having a proportion by weight in the liquid on an aqueous basis of between 0.1 to 20%.

11. The roller bearing of claim 9, wherein the proportion by weight of the metallic solid lubricant in the liquid on an aqueous basis is less than 10%.

12. The roller bearing of claim 9, wherein the proportion by weight of the metallic solid lubricant in the liquid on an aqueous basis is less than 5%.

13. An electrical geared motor comprising:

a first housing;

an electrical machine including a roller bearing having an inner ring, an outer ring and roller bodies, and a first lubricating liquid which is electrically conductive and configured to lubricate the roller bearing on an aqueous basis and also facilitate voltage equalization between the inner ring and the outer ring, wherein the lubricating liquid contains at least one of an ionization additive, an antifreeze, a surfactant and a dispersant, wherein the volume of the first lubricating liquid is such that a fluid level of the first lubricating liquid is higher than an inner wall of the outer ring at a lowest point of the inner wall;

a gearbox having a second housing connected to the first housing, the gearbox containing a water-based second lubricant liquid; and a rotor shaft configured to project into the gearbox, the rotor shaft being mounted in any one of the first housing and the second housing.

* * * * *